(12) United States Patent
Perchais et al.

(10) Patent No.: US 10,707,682 B2
(45) Date of Patent: Jul. 7, 2020

(54) METHOD FOR OPTIMIZING CONSUMPTION OF REACTIVE ENERGY

(71) Applicant: Mathieu Perchais, Maisons Laffitte (FR)

(72) Inventors: Mathieu Perchais, Maisons Laffitte (FR); Zheng Hu, Villeurbanne (FR)

(73) Assignee: Mathieu Perchais, Maisons Laffitte (FR)

( * ) Notice: Subject to any disclaimer, the term of this patent is extended or adjusted under 35 U.S.C. 154(b) by 101 days.

(21) Appl. No.: 15/528,048

(22) PCT Filed: Nov. 19, 2015

(86) PCT No.: PCT/FR2015/053131
§ 371 (c)(1),
(2) Date: May 18, 2017

(87) PCT Pub. No.: WO2016/079435
PCT Pub. Date: May 26, 2016

(65) Prior Publication Data
US 2017/0331288 A1 Nov. 16, 2017

(30) Foreign Application Priority Data
Nov. 19, 2014 (FR) ...................................... 14 61182

(51) Int. Cl.
*H02J 13/00* (2006.01)
*H02J 3/18* (2006.01)

(52) U.S. Cl.
CPC .............. *H02J 3/1864* (2013.01); *H02J 3/18* (2013.01); *H02J 13/0006* (2013.01);
(Continued)

(58) Field of Classification Search
CPC ........ H02J 13/0006; H02J 3/18; H02J 3/1864; Y02E 40/30; Y02E 40/74; Y04S 10/22
(Continued)

(56) References Cited

U.S. PATENT DOCUMENTS 4,359,678 A * 11/1982 Raivola ................. H02J 3/1828
323/211
2009/0160189 A1 * 6/2009 Rasmussen ............. F03D 7/028
290/44

(Continued)

FOREIGN PATENT DOCUMENTS

| FR | 2494055 A1 | 5/1982 |
|----|------------|--------|
| FR | 2693601 A1 | 1/1994 |
| FR | 2873866 A1 | 2/2006 |

*Primary Examiner* — Pinping Sun
*Assistant Examiner* — Brian K Baxter
(74) *Attorney, Agent, or Firm* — Harness, Dickey & Pierce, PLC

(57) ABSTRACT

A method for optimizing consumption of reactive power in an electrical network includes a system for monitoring and adjusting electrical power supply, the system including an electrical generator, electrical loads, a power compensation system, an electric transmission line, an electro-digital processor and a remote-readable meter. The method further includes: measuring the dataset of the electrical loads via at least one remote-readable meter; collecting the dataset of the electrical loads and transmitting it to the electro-digital processor in order to establish data curves; calculating a power factor of the electrical loads; enabling reactive power compensation by setting the type and configuration of the compensation systems to be installed, when the calculated power factor has a value lower than or equal to a predefined threshold value; and compensating for reactive power by actuating the installed compensation systems.

10 Claims, 4 Drawing Sheets

(52) U.S. Cl.
CPC .............. *Y02E 40/30* (2013.01); *Y02E 40/74* (2013.01); *Y04S 10/22* (2013.01)

(58) Field of Classification Search
USPC ........................................................ 307/103
See application file for complete search history.

(56) References Cited

U.S. PATENT DOCUMENTS

| | | | |
|---|---|---|---|
| 2009/0281675 A1* | 11/2009 | Rasmussen | F03D 7/047 700/287 |
| 2010/0067526 A1* | 3/2010 | Lovmand | F03D 7/047 370/389 |
| 2011/0169461 A1 | 7/2011 | Deaver, Sr. | |
| 2011/0204717 A1 | 8/2011 | Shaffer | |
| 2013/0046414 A1 | 2/2013 | Ree | |
| 2013/0134789 A1* | 5/2013 | Panosyan | H02J 3/1835 307/84 |
| 2014/0164718 A1 | 6/2014 | van Schaik et al. | |
| 2014/0371929 A1* | 12/2014 | Allen | G01R 19/2513 700/286 |
| 2016/0118792 A1* | 4/2016 | Rosendahl | H02J 3/16 700/295 |

\* cited by examiner

METHOD FOR OPTIMIZING CONSUMPTION OF REACTIVE ENERGY

CROSS-REFERENCE TO RELATED APPLICATIONS

This application is a National Phase Entry of International Patent Application Serial Number PCT/FR2015/053131, filed on Nov. 19, 2015, which claims priority to French Patent Application Serial No. 14/61182, filed on Nov. 19, 2014, both of which are incorporated by reference herein.

TECHNICAL FIELD

The present invention relates to the field of electrical network monitoring and to the optimization of reactive energy consumption. More specifically, it relates to a method for automating the detection of reactive energy and thus enable the optimization of energy consumption implemented in electrical networks.

BACKGROUND

A solution described in patent application FR2494055 is known in the state of the art. This application describes a device for compensating the reactive electrical energy in a network comprising at least one compensation unit connected to the network. The compensation unit comprises an inductor, a capacitor and a first bidirectional thyristor switch, and a second bidirectional thyristor switch, as well as control means comprising a logic OR gate, input, on the one hand, to a first measuring circuit that includes the detection of a predetermined threshold of the terminal voltage across said first switch and, on the other hand, to a second measuring circuit that includes the detection of a predetermined threshold of the terminal voltage across said second switch.

Also known is the solution proposed by patent application FR2693601, which describes a reactive power compensation device that includes means for measuring the current in the main power supply circuit, downstream of the connection of the controlled switch, and means for measuring a magnitude representative of the apparent power, connected to the output of the current measurement means. The opening of the controlled switch is actuated when said representative magnitude exceeds a predetermined threshold value.

Current regulation solutions for a reactive energy compensation system are also known in the state of the art. Patent application FR2873866 describes an example of a current regulation device. The device in question comprises a coupling transformer whose secondary winding is intended to be connected in series between an electrical power distribution network and a reactive energy compensation capacitor, an active filter comprising an inverter and a current control loop estimating a fundamental value of electric current, in order to provide closed-loop current control for the inverter of the active filter.

The solutions of the prior art relating to devices that compensate the reactive electrical energy in a network have several drawbacks. Some of the solutions are based on thresholds predetermined by machine, which do not provide the ability for remote reactive energy detection and therefore cannot be used to adapt to actual situations of use. Other solutions require the involvement of on-site workers at given times. This solution does not allow for remote monitoring and continuous optimization.

Moreover, the solutions of the prior art are suitable for compensating the individual electrical load. They do not allow for simultaneous centralized management of multiple sites. Finally, the solutions of the prior art are limited to passive compensation. The compensation devices must wait for the predetermined threshold to be triggered to start compensating. They do not allow for pre-programmed active compensation.

SUMMARY

In order to remedy these drawbacks, the invention relates, in its most general sense, to a method for optimizing the consumption of reactive energy in an electrical network using a monitoring and adjustment system, said system comprising an electricity generator, electrical loads, an electricity meter, a power compensation system, an electricity transmission line, and a digital electronic processor. The method comprises the steps of measuring the power consumed by the electrical loads by at least one electricity meter holding remote readings, collecting all this data and transmitting it to the digital electronic processor to draw up data curves, calculating the power factor of the electrical loads, identifying the need to compensate for the reactive energy when the calculated power factor has a value less than or equal to a predefined threshold value, determining the type and configuration of the compensation systems to be installed, and then controlling said compensation systems. Preferably, the measurement of all electrical load data, data collection, power factor calculation, and energy compensation are automated.

According to a particular embodiment, measurement of all electrical load data, data collection, power factor calculation, and energy compensation are monitored in real time and remotely. According to another embodiment, the steps in the method can switch between a periodic measurement mode and a measurement mode that is random in time. According to another particular embodiment, energy compensation is actively performed by pre-programming parameters.

Advantageously, two types of compensation may be carried out depending on the goals to be achieved. Thus, this could be a compensation referred to as "compensation targeted at the electrical loads" and a compensation referred to as "compensation targeted at the electrical network". "Compensation targeted at the electrical loads" means a compensation achieved when the power factor at the level of the electrical loads exceeds a certain threshold (threshold advantageously determined by the end users of the loads); and "compensation targeted at the electrical network" means a compensation achieved when the power factor at the level of the electrical network exceeds a certain threshold (threshold advantageously determined by the operators of the network).

According to one embodiment, the compensation targeted at the electrical loads is achieved by a compensation of the reactive energy according to a compensation mode selected from among one of the following three modes: an individual compensation mode, a local compensation mode, and a global compensation mode. According to another embodiment, the compensation targeted at the electrical network comprises a step for collecting the data, which is calculated, automatically uploaded in passive mode, and a logical compensation step, which takes the form of a distribution plan for the compensation targeted at the loads.

This invention has several advantages from a technical point of view: improved dimensioning adjustment, less voltage drops and line losses. From an economic standpoint, eliminating reactive energy consumption and increasing active power reduce the company's bill. Moreover, this invention allows for energy diagnostics to be performed remotely and, especially, eliminates the need for sending technicians on-site and installing expensive measuring instruments. It is a tailored service.

BRIEF DESCRIPTION OF THE DRAWINGS

The present invention will be best understood when reading the following description thereof, which relates to non-restrictive exemplary embodiments, while referring to the appended drawings, wherein.

DETAILED DESCRIPTION

Figure 1:
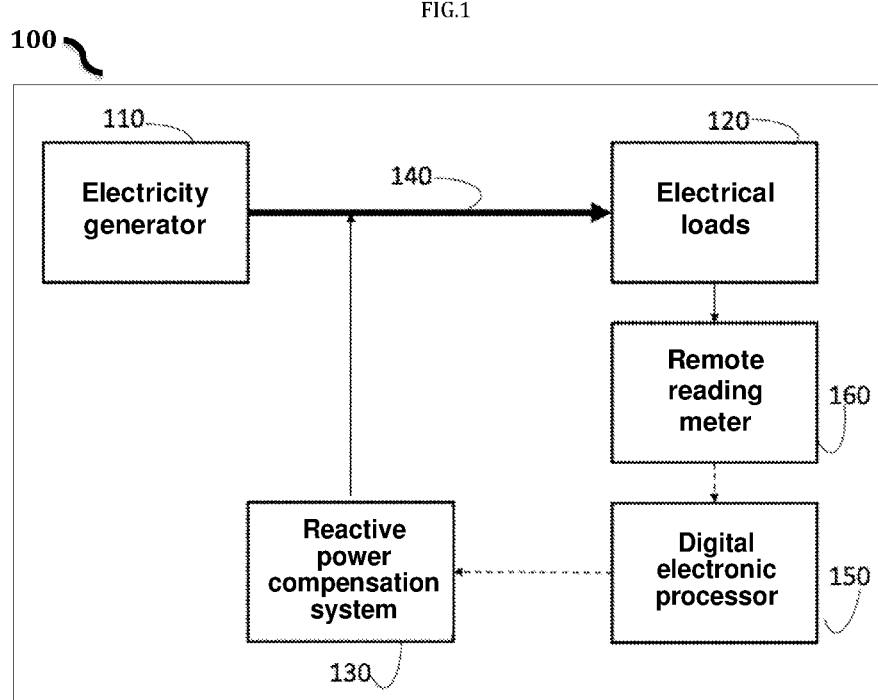
FIG. 1 shows a schematic diagram according to the invention illustrating a monitoring and adjustment system in an electrical grid.

FIG. 1 shows a schematic diagram according to the invention illustrating a power supply monitoring and adjustment system 100. The monitoring system comprises an electricity generator 110, electrical loads 120, a reactive power compensation system 130, an electricity transmission line 140, a digital electronic processor 150, and an electricity meter holding the remote readings 160.

The electricity generator 110 supplies energy to the electrical loads 120 via the electricity transmission line 140. In alternating current circuits, a transformer delivers a current at a certain fixed voltage. According to the characteristics of the electrical loads 120, they can be classified as resistive receptors, inductive receptors, and capacitive receptors. Inductive receptors and capacitive receptors induce phase shifts of the current with respect to the voltage. This phase shift causes useless consumption of electrical energy, which does not correspond to heat or mechanical effort. In order to save energy, the power compensation system 130 is set up and configured by the digital electronic processor 150.

Electricity meters 160 hold remote readings and measure the power consumed by the electrical loads according to the user's needs, either periodically at a predetermined time or automatically and continuously. The electricity meters are located either at the electrical load end, or at the electricity generator end, or are located as an intermediary. The electricity meters transfer the data on the power consumed by the electrical loads to the digital electronic processor 150, where the data is analysed by means of the algorithm used to determine the configuration to be applied to the controller of the power compensation system 130.

Figure 2:
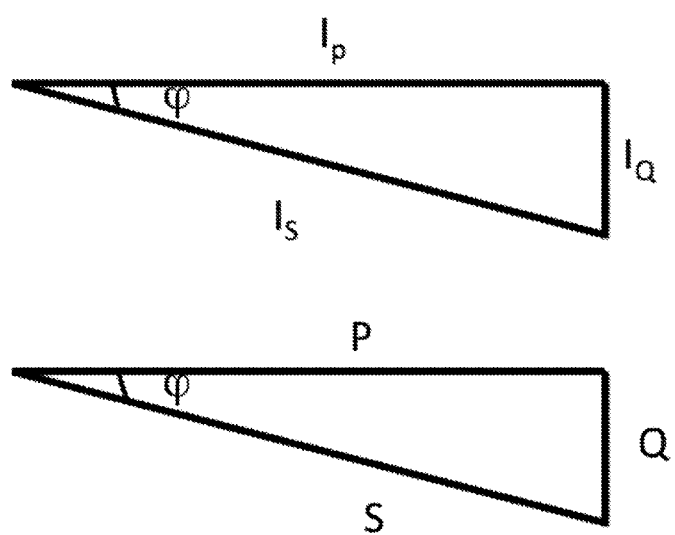
FIG. 2 shows the vectors of the apparent, active, and reactive parts of the current and of the power.

FIG. 2 shows the phase shift of the current and of the active and reactive power. The electrical loads comprise the inductive, capacitive, and resistive receptors, which can induce the phase shift. When an inductive/capacitive receptor is connected within the circuit, the total current Is will be phase-shifted from phi ($\varphi$) with respect to the voltage and broken down into two parts: the active current Ip=Is×cos $\varphi$, where the component is in phase with the voltage, and the reactive current Iq=Is×sin $\varphi$, where the component is 90° out of phase with the voltage.

In the active power formula:

$$P = U \times Is \times \cos \varphi$$

$\varphi$ is the phase shift of the total current with respect to the voltage, and the cow factor is called the power factor, which is often indicated on the electrical nameplate of most electrical machines. The reactive power Q is defined by analogy to the active power P:

$$Q = u \times Is \times \sin \varphi$$

The reactive power is used to assess the relevance of inductive receptors (motors, fluorescent lamps) and of capacitive receptors (capacitors) within the installation. The product of the voltage by the total current is called the apparent power S:

$$S = U \times Is$$

Figure 3:
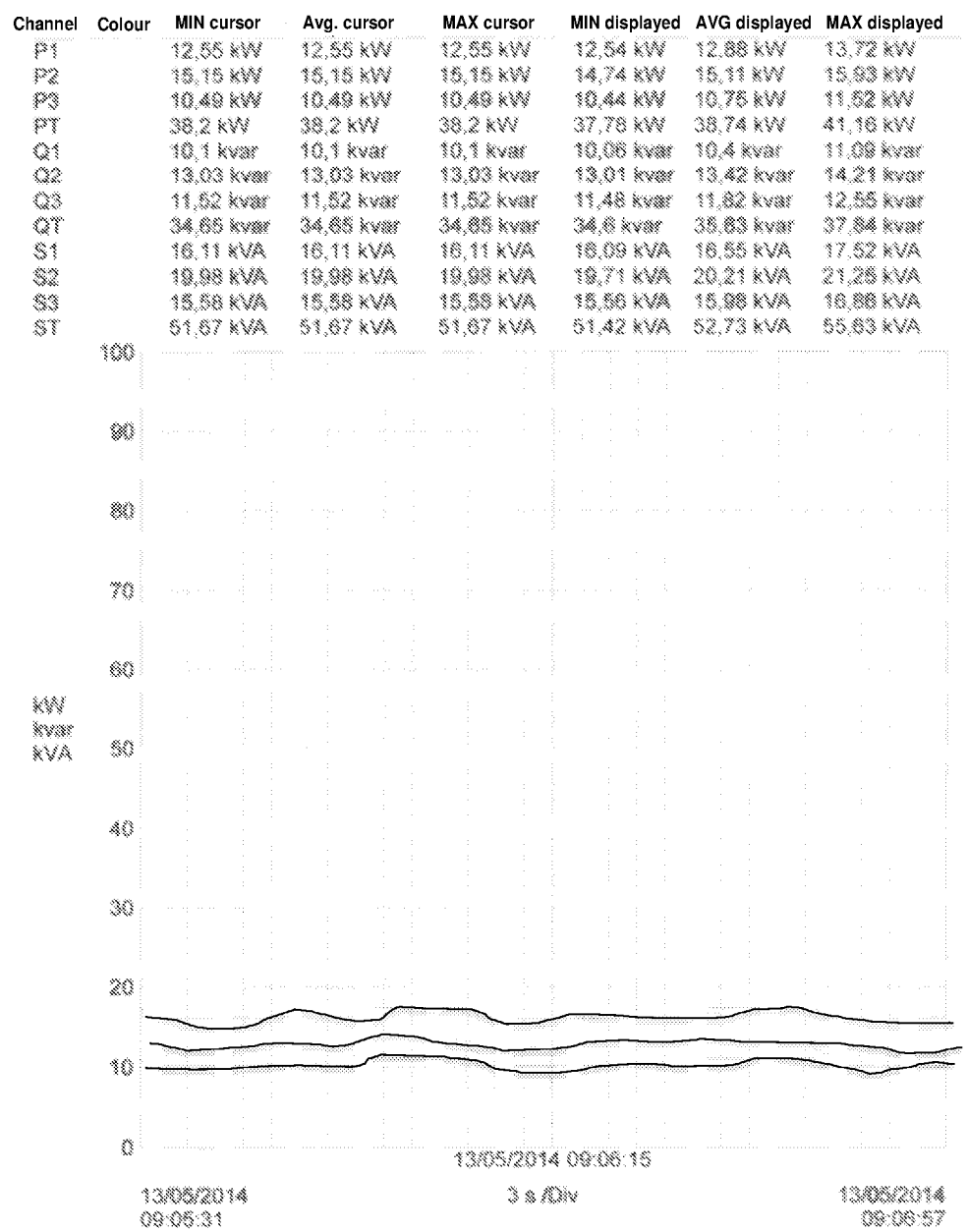
FIG. 3 shows the active power, reactive power, and apparent power in three-phase alternating current circuits.

FIG. 3 shows the active power, reactive power, and apparent power in three-phase alternating current circuits. This data is collected every second over a period of 90 seconds.

The electrical loads, supplied with alternating current, involve active and reactive energies, which correspond to the effort respectively at active and reactive powers for a certain duration. The active energy is transformed into mechanical energy or heat. The reactive energy is essentially due to the inductive/capacitive receptors present in the loads and does not correspond to heat nor to mechanical effort. In a known manner, the reactive energy can be reduced by connecting the compensation system, for example a capacitor bank system, to the electricity transmission line. The compensation system may also include an anti-harmonic filter, which aims to reduce harmonic distortion and to avoid peaks leading to overconsumption and affecting equipment lifetime.

Figure 4:
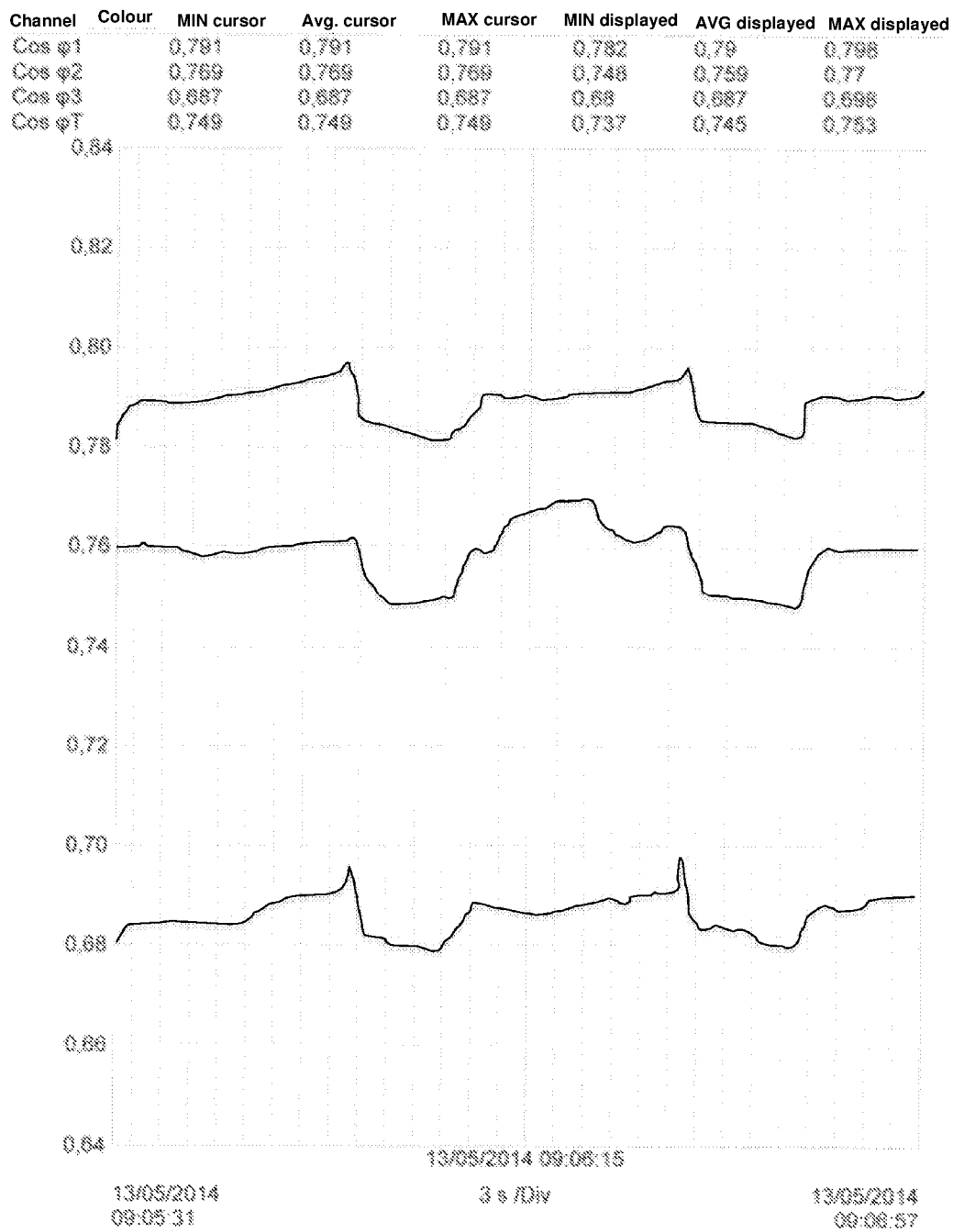
FIG. 4 shows the power factors of the three phases collected every second over a period of 90 seconds.

FIG. 4 shows the power factors of the three phases collected every second over a period of 90 seconds. The cow power factor at a value of 0.75 is below the predefined threshold value, which indicates that the reactive energy demand of the installation's equipment is too high. The purpose of the compensation is to maximize the power factor without inducing overcompensation/overload. For example, when the power factor is below 0.95, it triggers a high phase shift email alert. In addition, when the compensation becomes unnecessary, another alert is sent.

The process for optimizing energy consumption involves four steps. The first step consists in measuring, during a monitoring period, the power consumed by electrical loads. The measurement is carried out automatically and continuously for a given period of time or up to a predetermined amount of energy consumed. For example, based on the remote readings of the next generation electricity meters, the data is collected every 10 minutes. In a factory where workers work from 8 a.m. to 8 p.m., recording the power loads for one week will show the typical consumption behaviours, such as parameter changes as and when each machine is connected. When the reactive energy consumption exceeds a certain threshold before the end of the week, thus indicating a waste of energy, the monitoring period ends sooner.

The second step consists in transmitting the data to the digital electronic processor 150, which analyses the type of phase shift (advance or delay), the time at which the phase shift occurred, and the duration of the phase shift. In a known manner, the capacitive current phase is in advance of the voltage phase by 90°, whereas the inductive current phase is delayed by 90°. The resistive receptors do not change the current phase.

The third step is a diagnostics step in which the compensation algorithm calculates the power factor and, if necessary, triggers an alert, depending in particular on the contract binding the electricity supplier and the user who owns the electrical loads. An example of this is the one shown in FIG. 4: The recommended value of the cow power factor in the range (0.95, 1) is considered to be the optimized situation. Outside this range, the compensation system is activated either under manual control or automatically. In order to ensure the stability of the compensation system, the duration of the power factor outside this range is also considered.

The fourth step consists in installing the compensation equipment in a compensation mode that is suitable for the network concerned and for the network's needs. Compensation can thus be carried out in three modes.

The first mode consists in an individual compensation: The compensation equipment is directly connected to the terminals of each inductive/capacitive receptor. This compensation is ideal from a technical standpoint since it produces the reactive energy right where it is consumed, and in a quantity that is adjusted to the demand. However, this compensation is preferably used for the machine whose operating schedules reach into certain hours and/or whose reactive energy reaches a certain threshold.

The second mode consists in a local compensation: The compensation equipment is installed sector by sector. In one sector, several machines with different receptors are connected to the same power supply network. The power load curve of a sector shows reactive powers and reactive energies resulting from the cancellation and amplification of the phase shift of the various machines connected within this sector.

The third mode consists in a global compensation: The compensation equipment is installed ahead of the electrical loads and handles all the loads of the compensation. They help relieve the transformer installed by the electricity supplier. However, the phase shift may vary randomly due to the collective effect of all the connected machines.

All the steps are automated and can be controlled in real time and remotely. Depending on the consumption history, the parameters can be programmed upstream to actively compensate for the use of the electrical loads. Depending on the user's requirements, the parameters may be different at the requested time, such that the range of the cow power factor can be modified from a remote location so as to have, for example, an afternoon value that is different from the morning value and respectively.

Due to the periodicity of some machines, the periodic measurement mode may hide some information. Switching from a periodic measurement mode to a random measurement mode helps to verify certain information. Also, and advantageously, when the load power measurement function is performed in random mode, all the other functions switch to random mode.

Compensation is based on the goals to be achieved. There generally are two categories of goals to be achieved: One that relates to the electrical loads and one that relates to the electrical network. The compensation targeted at the electrical loads is a compensation achieved when the power factor at the level of the electrical loads exceeds a certain threshold determined by the end users of the loads, whereas the compensation targeted at the electrical network is a compensation achieved when the power factor at the level of the electrical network exceeds a certain threshold determined by the operators of the network.

The examples above concern a compensation targeted at the loads for end users, in particular SMEs/SMIs, or communities. The collected data is raw data concerning the consumption of reactive energy by electrical loads. And the compensation is carried out by remotely controlling the compensation device, for example a capacitor bank.

The following paragraphs present the compensation targeted at the electrical network. The problem with the state of the art is that it is normally carried out from top to bottom. The document entitled "Realization of reactive power compensation in distribution transformer monitoring system" presented at the International Electricity Distribution Conference (CICED) 2012, presents the realization of a device for the compensation targeted at the network based on a distributed transformer system. However, it is merely a global compensation based on aggregate consumption data, no method of the prior art includes the ability to compensate by checking and controlling the compensation of a group of SME/SMI or community users.

Our proposal is to provide a compensation method target at the network based on a distribution system. With the compensation targeted at the loads, the individual compensation data is obtained for the loads of each SME/SMI user. And with this data, a compensation can be carried out with respect to the public power grid by controlling each user. Thanks to actuating sensors driven from a cloud-based technical platform, end-user reactive energy consumption can be controlled. Actuating based on the distribution network's own constraints is also possible, regardless of whether it is public or concerns a network of various users.

Two aspects are developed in the areas of data collection and compensation in order to achieve compensation targeted at the network. In the compensation targeted at the loads, data collection is a remote reading performed in active mode with raw data, whereas for the compensation targeted at the network, data collection is a measurement performed in passive mode with all the data that has already been calculated and uploaded automatically. Moreover, in the compensation targeted at the loads, the compensation is physical by means of devices such as a bank, whereas the compensation targeted at the network is logical, which takes the form of a distribution plan for the compensation targeted at the loads in order to provide a benefit to the entire electrical network.

The compensation is based on a two-tiered technical infrastructure:

1st tier,

A platform comprising a cloud-based aggregation engine, search engine, and calculation engine in order to achieve the following:
  determine whether a user is eligible for reactive energy compensation,
  supervise reactive energy,
  enable electricity operators, such as EDF, to use the data model for their Big Data production platforms.

2nd tier,

Wireless actuators (internet of things) installed in addition to the hardware part of the reactive energy compensation and driven by the platform.

Figure 5:
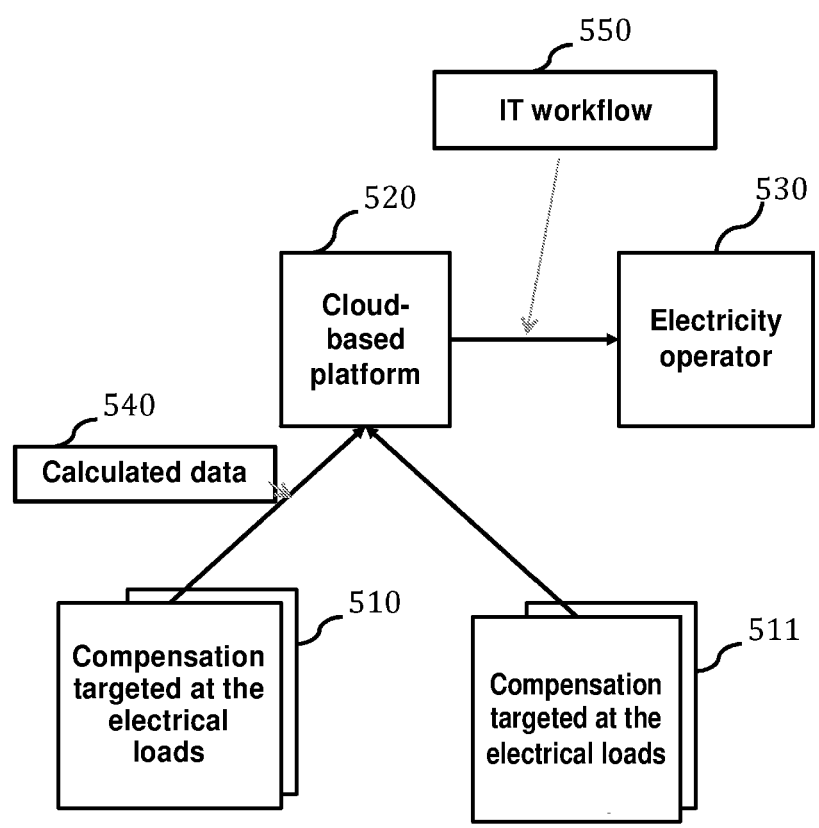
FIG. 5 shows a schematic diagram illustrating the flow of the data collected between the compensation targeted at the electrical loads and the compensation targeted at the electrical network.

FIG. 5 shows a schematic diagram illustrating the flow of the data collected between the compensation targeted at the electrical loads and the compensation targeted at the electrical network. The compensations have already been performed at the level of the loads 510 and 511. Then, previously calculated data 540 is transmitted to the cloud-based platform 520. The cloud-based platform 520 transfers the IT flow for the compensation targeted at the network 550 to the various electricity operators.

This schematic diagram of the compensation can be better understood with the concrete example of a community, within which the various loads have different compensation levels. For the community that includes different loads, such as the swimming pool, the cable outlets to the light spots of the public lighting, the central school canteen, each of these loads can be individually compensated according to the compensation method targeted at the loads. Moreover, thanks to the automatically uploaded data, the compensation targeted at the network could be made for the benefit of the public power grid, such as EDF's.

In the case of a global cow power factor of 0.8 obtained by means of the automatic data upload system with the individual compensation of the loads, however, without reaching all the equipment, the platform carries out an execution plan for the compensation targeted at the network. Thus, if one takes the example of the pool compensated at 0.93 and light spots that cannot be compensated individually, the compensation targeted at the network consists in controlling the individual compensation of the pool above 0.93 for the benefit of the entire network.

The main advantage of the compensation targeted at the public distribution network is that it alleviates the constraint on the transmission system operator, which must carry reactive energy, including all the way to the end of the line, such as in the French departments of Var and Alpes-Maritimes. This is how compensating reactive energy on a large scale among thousands of end users is a credible alternative to strengthening the high-voltage electrical network in the French Provence-Alpes-Cote d'Azur region, especially considering that the tertiary sector is largely equipped with air conditioning compressors. Air conditioning compressors are indeed likely to have a degraded power factor.

The invention claimed is:

1. A method for optimizing consumption of reactive energy in an electrical network by a power supply monitoring and adjustment system, the power supply monitoring and adjustment system comprising an electricity generator, electrical loads, a power compensation system, an electricity transmission line, a digital electronic processor, and at least one meter holding remote readings, the method comprising:
    measuring power consumed by the electrical loads using the at least one meter holding the remote readings;
    collecting the power consumed by the electrical loads and transmitting it to the digital electronic processor to draw up data curves;
    calculating a power factor of the electrical loads;
    generating an alert in response to the calculated power factor being less than or equal to a first predetermined threshold;
    based on an alert indicator, transmitting the alert to a predetermined electricity supplier;
    determining an installed type and configuration of the power compensation system based on an individual compensation configuration system, a local compensation system, or a global compensation system; and
    in response to the determining the installed type and configuration of the power compensation system being suitable for the electrical network and in response to the calculated power factor being less than or equal to a second predetermined threshold value, compensating reactive energy by controlling the installed power compensation system.

2. The method for optimizing energy consumption in the electrical network of claim 1, wherein the individual compensation system configuration includes compensation equipment directly connected to a set of terminals of each inductive receptor or capacitive receptor.

3. The method for optimizing energy consumption in the electrical network of claim 1, wherein the individual compensation system configuration is suitable when the electrical network includes a machine, wherein an operating schedule of a machine exceeds a time threshold or a machine reactive energy of a machine exceeds a machine threshold.

4. The method for optimizing energy consumption in the electrical network of claim 1, wherein the local compensation system configuration includes compensation equipment installed sector-by-sector.

5. The method for optimizing energy consumption in the electrical network of claim 1, wherein the local compensation system configuration is suitable when various machines are connected within a sector.

6. The method for optimizing energy consumption in the electrical network of claim 1, wherein the global compensation system configuration includes compensation equipment ahead of the electrical loads.

7. The method for optimizing energy consumption in the electrical network of claim 1, wherein the global compensation system configuration is suitable when the electrical network includes a plurality of machines.

8. The method for optimizing energy consumption in the electrical network of claim 1, wherein the alert indicator indicates an alert preference of the electrical supplier.

9. The method for optimizing energy consumption in the electrical network of claim 1, wherein the compensation targeted at the electrical network includes a step for collecting data that has been previously calculated and automatically uploaded in passive mode.

10. The method for optimizing energy consumption in the electrical network of claim 1, wherein the compensation targeted at the electrical network is logical, taking the form of a distribution plan for the compensation targeted at the loads.

* * * * *